Feb. 7, 1928. 1,658,217
F. D. WINKLEY
LUBRICATING SYSTEM
Filed Feb. 25, 1921 2 Sheets-Sheet 1
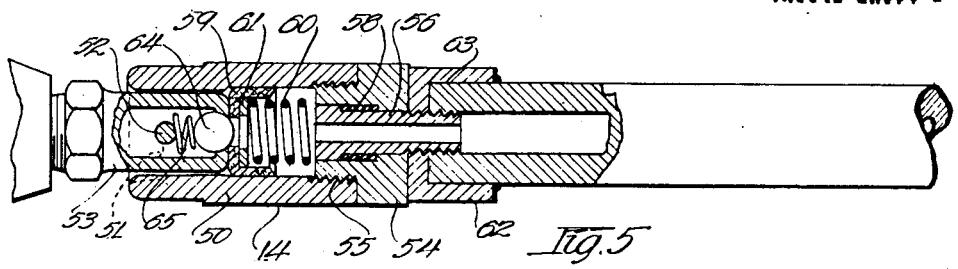
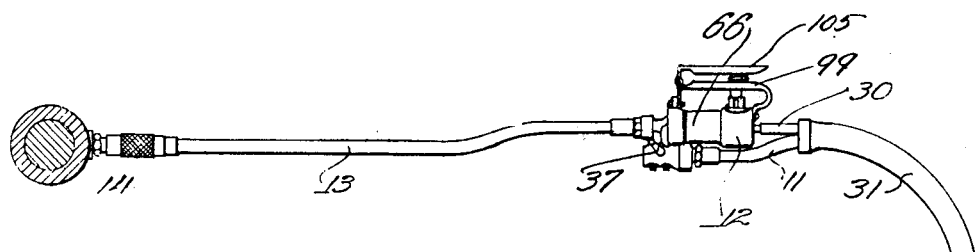
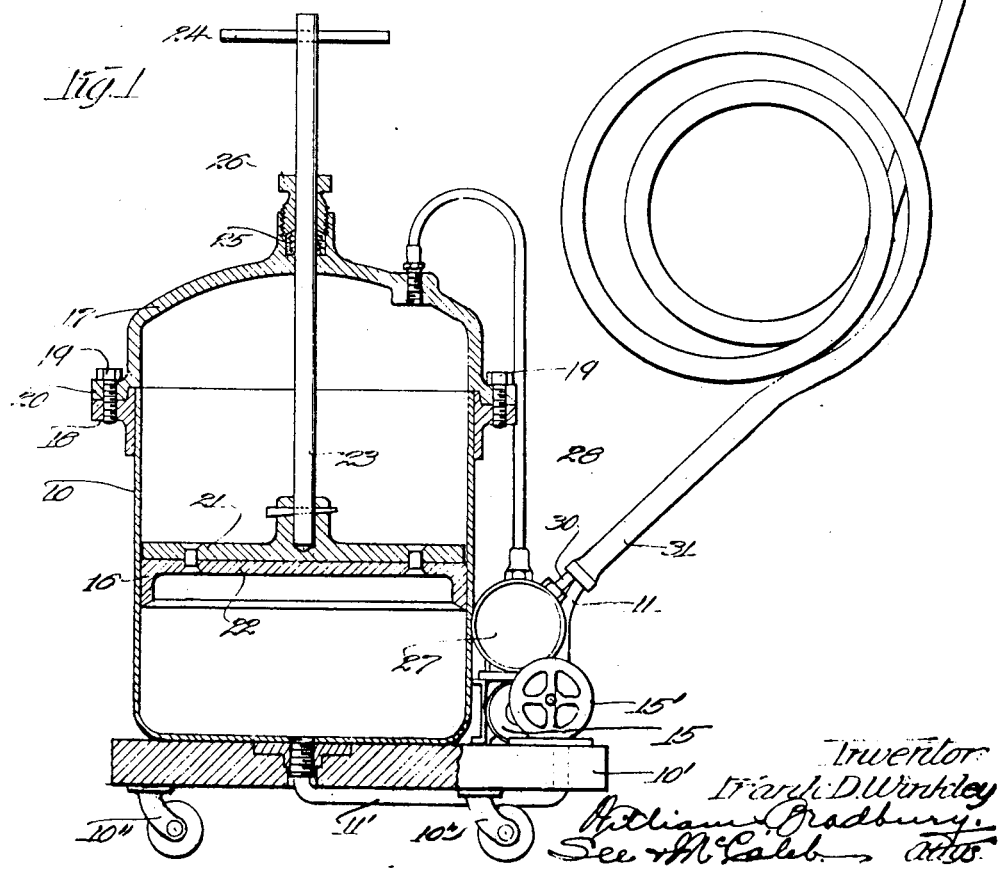

Feb. 7, 1928. 1,658,217
F. D. WINKLEY
LUBRICATING SYSTEM
Filed Feb. 25, 1921 2 Sheets-Sheet 2
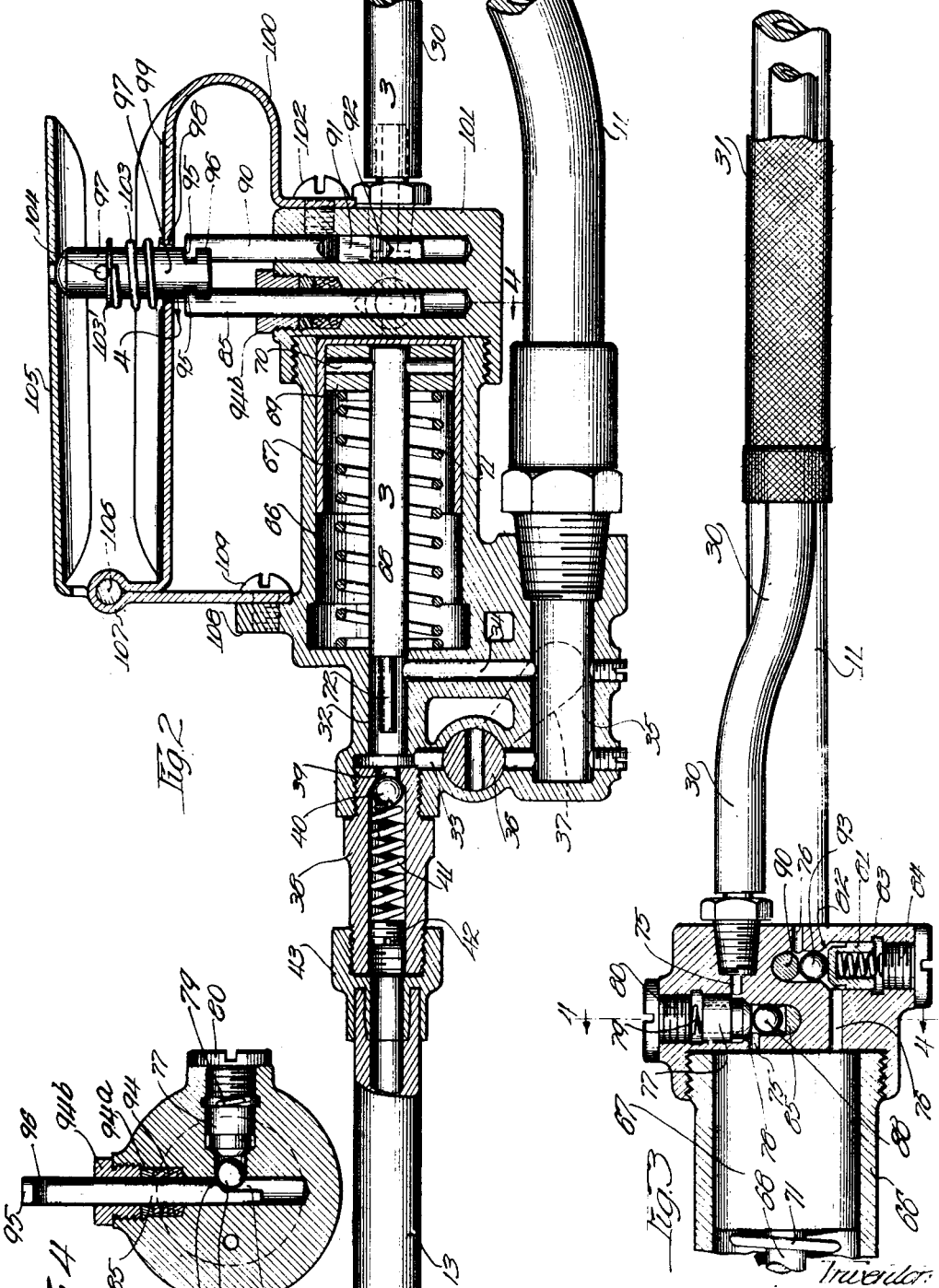

Patented Feb. 7, 1928.

1,658,217

UNITED STATES PATENT OFFICE.

FRANK D. WINKLEY, OF CHICAGO, ILLINOIS, ASSIGNOR TO THE BASSICK MANUFACTURING CO., A CORPORATION OF DELAWARE.

LUBRICATING SYSTEM.

Application filed February 25, 1921. Serial No. 447,730.

My invention relates to improvements in lubricating systems, and is particularly concerned with improvements in that type of lubricating system comprising a plurality of coupling members, or nipples, which are secured to the bearings to be lubricated, and a lubricant compressor having a flexible discharge conduit provided with means for successively making a sealed, quick detachable connection with the nipple so that lubricant under sigh pressure can be forced into the various bearings.

The objects of my present invention are—

First. To provide a system of the character described, comprising power operated means for receiving lubricant and forcing it into the bearing under high pressure.

Second. To provide a system of the character described comprising a power operated compressor located in proximity to the coupling member so that its operation can be controlled by one hand of the operator, the other hand of the operator thus remaining free to manipulate the coupling, to attach it and detach it from the nipples.

Third. To provide a system of the character described comprising a power-operated compressor so constructed that it can be controlled by the operator to deliver any desired number of charges of lubricant of predetermined size to the bearing, or bearings, to be lubricated.

Fourth. To provide a system of the character described, comprising a source of lubricant under pressure having a flexible discharge conduit, a power operated compressor secured to the end of said discharge conduit, and provided with a second discharge conduit, the free end of which has secured thereto a coupling member for making a quick detachable connection with the nipples secured to the bearings, said compressor being designed to deliver the lubricant to the bearings under a pressure greater than the initial pressure on the lubricant.

Fifth. To provide a system subsequently described, wherein the lubricant is discharged from the supply and the compressor is operated by compressed air, and Sixth. To provide a novel type of lubricant compressor comprising means for relieving the pressure in its discharge conduit, so as to permit the coupling member at the free end thereof to be detached from a nipple without the escape of lubricant from the discharge conduit.

Other objects will appear as this description progresses, reference being had to the accompanying drawings in which—

Figure 1 is a view partially in elevation and partially in section showing certain details of construction of my improved lubricating system;

Figure 2 is a longitudinal section through portions of my improved compressor;

Figure 3 is a sectional detail taken on line 3—3 of Figure 2;

Figure 4 is a transverse section taken on line 4—4 of Figures 2 and 3, and

Figure 5 is a central longitudinal section showing the details of construction of the coupling member which I provide for making the detachable connections with the nipples, which are to be supplied with the lubricant.

Throughout the several views, similar reference characters will be used for referring to similar parts, and the various sections are taken looking in the direction of small arrows.

Briefly speaking, my invention comprises a container 10 for holding lubricant under pressure, said container having a discharge conduit 11, preferably formed of flexible material, and a power operated compressor 12. The compressor 12 is provided with a flexible discharge conduit 13. to one end of which is secured a coupling member indicated as a whole by the reference character 14. In the particular embodiment of my invention, herein disclosed, I prefer to use an air compressor 15 for actuating the compressor 12 and for supplying the medium to maintain continuous pressure upon the lubricant in container 10.

Container 10 comprises a bottom portion 16 for holding the lubricant, and the cap 17, which can be detachably secured to the flange 18 of the bottom portion by means of screws 19, which pass through the annular flange 20 at the bottom of the cap 17. A piston comprising the follower 21 and the cup leather 22 is slidable in the container, and may be lifted upwardly by means of the piston rod 23 and the handle 24 to position the piston in the cap 17 so that it may be removed with the cap for the purpose of filling the lower portion of the container. The piston rod 23 passes through a suitable stuffing box comprising a gland 25, and a follower 26 which prevent the escape of compressed air from the upper portion of the container. The compressed air is conducted from the storage reservoir 27 connected with the compressor 15 by the conduit 28, which is preferably made of flexible material so that it can be flexed during the removal of the cover 17. The portion 11' of the discharge conduit which leads from the bottom of the container 10 may, if desired, be made from metal or other rigid material.

A flexible conduit 30 leads from the storage reservoir 27. Preferably, the two flexible conduits 11 and 30 are provided with a single braided covering 31. I prefer to mount the container 10, the air compressor 15, the electric motor 15', by which it is operated, and the storage reservoir 27, upon a platform 10' which is made portable by means of casters 10'', or in any other suitable manner.

Referring now to Figures 2, 3 and 4, I shall describe the details of construction of the compressor 12. This compressor comprises a pump cylinder 32, having the ports 33 and 34 adjacent its opposite ends. Both of these ports are adapted to receive lubricant from the passageway 35 into which the discharge conduit 11 empties. The port 33 is provided with a valve 36, which can be manually controlled by the handle 37, either to prevent the flow of lubricant through the port 33, or by turning it at right angles to the position shown in Figure 2 to permit a flow of lubricant through the port 33.

A tubular member 38, which is screwed into the casting forming the body portion of the compressor, has an opening 39 formed therein which acts as a discharge passageway for the cylinder 32. I provide a ball valve 40 for closing the discharge orifice 39, this valve being yieldingly held in its closed position by a spring 41, one end of which bears against the valve and the other end of which abuts against the collar 42, which is threaded into the end of the tubular member 38, opposite the discharge orifice 39. A union 43 connects the last mentioned end of the tubular member 38 with the discharge conduit 13 of the compressor. Preferably, this conduit is made of flexible metallic hose, adapted to withstand very considerable pressure. The free end of the discharge conduit 13 described above is provided with a coupling member indicated as a whole by the reference character 14. Briefly speaking, this coupling member comprises a sleeve 50, the outer end of which is provided with a bayonet slot 51 for receiving the ends of the pin 52, which projects from the nipple 53, and its inner end is connected with the collar 54, by the screw threaded connection 55. The collar 54 is swiveled upon a tubular member 56, a suitable packing 58 being interposed between these two members to prevent leakage. A cup leather or gasket 59 is slidably mounted in the sleeve 50, and urged into sealing contact with the end of the nipple 53 by a spring 60, one end of which abuts against a washer 61, bearing against the bottom of the cup leather, and the other end of which abuts against the adjacent end of the tubular member 56. The inner end of the tubular member 56 is screw threaded into the bottom of the cup 62, and it, as well as the cup 62, is secured to the free end of the discharge conduit 13, by solder 63, or in any other suitable manner. Preferably, the nipples 53 are provided with ball closures 64, which are held in place by means of compression springs 65. The details of construction of the coupling described above are already known, and form no part of my present invention except as they may co-act with the remaining portions of my lubricating system.

Referring again to the compressor, it comprises, in addition to the elements described above, an air cylinder 66, which is arranged in alignment with the pump cylinder 32, and in which is reciprocally mounted a cup piston 67. This piston is connected with the piston 68, which operates in the pump cylinder 32, the connection being provided by means of the disc 69, which is positioned within the cup piston 67, and which is secured to the end of the piston 68 by means of a pin 70. The compression spring 71 positioned between the disc 69 and the outer end of the cylinder 66 provides means for actuating the cup piston 67 and the pump piston 68 on their return stroke. The pump piston 68 is provided with a rod-like extension 72, which is adapted to project through the discharge port 39 of the pump cylinder and hold the closure 40 open during the operation of the return stroke of the pump piston, thereby causing a slight amount of suction upon the lubricant in the discharge conduit 13, which will cause the lubricant therein to be sucked back into the pump piston, and thus prevent it from being discharged from the coupling member when the coupling member is detached from a nipple.

Compressed air is supplied to the cylinder 66 through the conduit 30 and the intake port 75, and exhausted from the cylinder through the exhaust port 76. The supply of air to the cylinder is controlled by the valve 77, which closes against the seat 78 formed in the port 75. This valve is held in closed position by the compression spring 79, the outer end of which abuts against the inner end of the screw plug 80. The flow of air from the cylinder 66 through the port 76 is controlled by a similar valve 81, which closes against the seat 82 formed in the port 76, and is yieldingly held in closed position by the spring 83, the outer end of which abuts against the plug screw 84. For actuating the valve 77, I provide the push rod 85, which is cut away as shown at 86 to provide a cam portion 87. Upon moving the rod 85 inwardly, the cam portion 87 engages the ball 88, and pushes it against the adjacent end of the valve 77, thereby opening the valve.

In a similar manner, the valve 81 is operated by the push rod 90, which is cut away as indicated at 91 to provide a cam portion 92. The cam portion 92 upon an outward movement of the push rod 90 engages the ball 93, and pushes it against the adjacent end of the valve 81, thereby causing this valve to open.

The push rod 85 is provided with a stuffing box comprising the gland 94, the bush 94ª, and the follower 94ᵇ, to prevent leakage of air from the inlet port.

The two push rods 85 and 90 extend in parallel relation, and their outer ends are provided with tongues 95 and grooves 96 for engaging the complementary grooves and tongues formed on the inner end of the rod 97. This end of the rod 97 operates through an opening 98 formed in the finger grip 99. One end 100 of the finger grip 99 extends parallel with the portion through which the rod 97 passes, and is secured to the end cap 101 of the air cylinder 66 by a screw 102. The rod 97 is held in its outermost position by means of a compression spring 103, one end of which engages the finger grip 99 and the opposite end of which bears against a washer 103', surrounding the rod 97 and positioned by a pin 104.

The rod 97 can be pushed inwardly by means of the handle 105, one end of which is pivoted upon the pintle 106 which is carried by the end of the finger grip 99, opposite the portion 100 which is bent upon itself to form a support 107 for the pintle 106, and secured to the lug 108 projecting from the cylinder 66 by means of a screw 109.

Assuming that the container 10 has been filled with a suitable lubricant, and that air under sufficient pressure has been admitted to the top end of the container to displace the lubricant through the discharge conduit 11, the mode of operation would then be as follows: The operator will first attach the coupling member 14 to a nipple secured to a bearing to be lubricated. By then moving the handle 105 toward the finger grip 99, he will admit air to the cylinder 66, which will cause the pistons 67 and 68 to move forward under the pressure of the air, and against the tension of the spring 71. As the piston 68 moves outwardly, the end of the extension 72 engages the valve 40 and displaces it from its seat, thereby opening the discharge passageway 39. If the resistance of the bearing is so low that the pressure on the lubricant in the container 10 is sufficient to overcome this resistance, and flush the bearing with fresh lubricant, the operator will first press the handle 105 toward the finger grip 98 to permit air to enter the cylinder 66 and move the piston 67 forwardly sufficient to cause the valve 40 to be opened by the rod 72, and will then merely turn the valve 36 so as to permit lubricant to be discharged through the port 33 and discharge port 38 into the conduit 13, and from there into the bearing. If, however, the resistance of the bearing requires greater pressure to force the lubricant therethrough, the operator will alternately depress the handle 105 and release it, thereby causing the piston 68 to reciprocate in the cylinder 32, and thus cause successive slugs of lubricant to be forced into the discharge conduit 13 under pressure sufficiently high to overcome the resistance of the bearing. This lubricant will enter the cylinder 32 through the port 34. It will thus be seen that the piston 68 in addition to acting as a piston proper, also acts as a valve to seal the port 34 during the pressure stroke. If the cylinder 32 is of known capacity, the operator can determine the exact quantity of lubricant which has been furnished to the various bearings by merely counting the reciprocations of the piston, which will correspond in number to the number of times the handle 105 has been depressed.

The spring 41 should be given sufficient tension to withstand the pressure exerted upon the lubricant by the compressed air in the container 10, otherwise it would open the valve 40, and permit the lubricant to be discharged through the discharge conduit 13, when the coupling member is detached from the nipple.

While I have described the details of construction of the preferred embodiment of my invention, it is to be clearly understood that my invention is not limited to these details, but is capable of other adaptations and modifications within the scope of the appended claims.

Having thus described my invention, what I claim is:

1. A lubricating system comprising a lubricant container having a flexible discharge conduit, a pump secured to the free end of said conduit, said pump comprising a pump cylinder having an intake port adjacent each end connected with said flexible conduit, a manually controllable valve in one of said ports, and a discharge port in the end of said cylinder adjacent said last named port, a spring-pressed valve for closing said discharge port, a second flexible discharge conduit connected with said discharge port, a coupling member on the free end of said second flexible discharge conduit, a piston movable in said pump cylinder, a projection extending from said piston for holding said spring-pressed valve open during the course of the return stroke of said piston, an air cylinder aligned with said pump cylinder, a piston in said air cylinder, means for connecting said pistons to move together, a spring for actuating said pistons upon their return stroke, and a manually operable valve mechanism for controlling the admission of air to and exhaust from said air cylinder.

2. A lubricating system comprising a lubricant container having a flexible discharge conduit, a pump secured to the free end of said conduit, said pump comprising a pump cylinder having an intake port at one end connected with said flexible conduit, and a discharge port in the other end of said cylinder, a spring-pressed valve for closing said discharge port, a second discharge conduit connected with said discharge port, a coupling member on the free end of said second discharge conduit, a piston movable in said pump cylinder, a projection extending from said piston for holding said spring-pressed valve open during the course of the return stroke of said piston, an air cylinder, a piston in said air cylinder, means for connecting said pistons to move together, a spring for actuating said pistons upon their return stroke, and a manually operable valve mechanism for controlling the admission of air to and exhaust from said air cylinder.

3. A lubricating system comprising a lubricant container having a flexible discharge conduit, a pump secured to the free end of said conduit, said pump comprising a pump cylinder having an intake port at one end connected with said flexible conduit, and a discharge port in the other end of said cylinder, a spring-pressed valve for closing said discharge port, a second discharge conduit connected with said discharge port, a coupling member on the free end of said second discharge conduit, a piston movable in said pump cylinder, an air cylinder, a piston in said air cylinder, means for connecting said pistons to move together, a spring for actuating said pistons upon their return stroke, and a manually operable valve mechanism for controlling the admission of air to and exhaust from said air cylinder.

4. A lubricating system comprising a lubricant container having a flexible discharge conduit, a pump, comprising a pump cylinder having an intake port adjacent one end, connected with said discharge conduit, and a discharge port adjacent the other end, a spring-pressed valve for closing said discharge port, a second flexible discharge conduit connected with said discharge port, and provided at its free end with a coupling member, a piston slidable in said pump cylinder, a motor for reciprocating said piston, and means for holding said valve open during a portion of the return stroke of said piston to relieve the pressure on the lubricant in said second flexible discharge conduit.

5. A lubricating system comprising a lubricant container comprising means for placing comparatively low pressure on the lubricant therein and having a discharge conduit, a pump, comprising a pump cylinder having an intake port adjacent one end, connected with said discharge conduit, and a discharge port adjacent the other end, a spring-pressed valve for closing said discharge port, means for holding said valve open while lubricant is passing through said discharge conduit under said low pressure, a second discharge conduit connected with said discharge port, and provided at its free end with a coupling member, a piston slidable in said pump cylinder, and a motor for reciprocating said piston.

6. A lubricating system comprising a pump having a cylinder provided with a discharge port, a discharge conduit connected with said discharge port, a spring pressed valve for closing said discharge conduit, a piston slidable in said cylinder, a coupling member at the free end of said discharge conduit for making detachable connection with a lubricant receiving device, means operated by said piston for holding said valve open during a portion of the return stroke of said piston, and means for supplying lubricant under pressure to said cylinder at a point adjacent said discharge port.

7. A lubricating system comprising a pump having a cylinder provided with a discharge port, a valve for closing said discharge port a discharge conduit connected with said discharge port, a piston slidable in said cylinder, a coupling member at the free end of said discharge conduit for making detachable connection with a lubricant receiving device, means for holding said valve open during a portion of the return stroke of said piston, and means for supplying lubricant under pressure to said cylinder at a point adjacent said discharge port.

8. A lubricating system comprising a high pressure pump having a discharge conduit, a source of lubricant under pressure, means for establishing a by-pass around said pump to permit the lubricant to flow through said discharge conduit under said lower pressure, a check valve for preventing lubricant from flowing through said discharge conduit under said low pressure, manually controlled means for opening said check valve, and means for relieving the pressure on the lubricant in said discharge conduit.

9. A lubricating system comprising a pump having a cylinder provided with an inlet port adjacent each end, means for supplying lubricant to both of said ports, a piston slidable in said cylinder, a discharge port adjacent one of said inlet ports, a valve for said discharge port, means for holding said valve open during a portion of the return stroke of said piston and a valve for closing said last-mentioned inlet port.

10. In high pressure lubricating apparatus of the class described, a lubricant container, non rigid conduit means through which lubricant from said container is discharged, said means terminating in an end adapted to have secured thereto a coupling for making a quick detachable connection with the lubricant receiving nipple, means for connecting said container with a source of energy to apply pressure to the lubricant therein, a booster in said conduit means and adjacent said end whereby one of the operator's hands may be employed to operate said coupling and the other hand employed to carry and operate said booster, power operated means in said booster for increasing the pressure on the lubricant, a handle for carrying said booster, a manually movable member for controlling said power operated means, said handle and said member so positioned that the booster can be carried and operated with one hand.

11. Lubricating apparatus of the class described comprising, in combination, a lubricant container, a discharge conduit therefor terminating in an end adapted to have secured thereto a coupling for making a sealed connection with a part to be lubricated, means for connecting said container with a source of energy to apply a relatively low pressure to the lubricant therein, a booster in said conduit, said booster movable relatively to said container, means in said booster for increasing the pressure on the lubricant, a motor for operating said pressure increasing means, a power conduit for connecting said motor with said source of energy, means for holding said power conduit in juxtaposition to said discharge conduit, a handle for carrying said booster, and a manually operated member for controlling said motor, said member being adjacent said handle part to permit one hand operation of said booster, and said booster adjacent the end of said discharge conduit whereby said coupling can be operated by one of the operator's hands and said booster by the other hand.

12. In high pressure apparatus of the class described, a mobile lubricant container, flexible conduit means through which lubricant from said container is discharged, said means terminating in an end adapted to have secured thereto a coupling for making a sealed connection with a lubricant receiving nipple, an inlet for connecting the interior of said container with a source of fluid pressure, a booster in said conduit means and adjacent said end whereby one of the operator's hands may be used to operate said coupling and the other hand used to carry and operate said booster, fluid means in said booster for increasing the pressure on the lubricant, a handle for carrying said booster, a manually movable member for controlling said power operated means, said handle and said member so positioned that the booster can be carried and operated with one hand, and a flexible conduit for connecting said booster with a source of fluid pressure.

13. Lubricating apparatus of the class described comprising, in combination, a lubricant container, a discharge conduit therefor terminating in an end adapted to have secured thereto a coupling for making a sealed connection with a part to be lubricated, an inlet whereby compressed air under relatively low pressure is admitted to the interior of said container, a booster in said conduit, said booster movable relatively to said container, compressed air operated differential piston means in said booster for increasing the pressure of the lubricant above the pressure of the air supplied thereto, a power conduit for connecting said booster with a source of air under pressure, means for holding said power conduit in juxtaposition to said discharge conduit, a handle for carrying said booster, and a manually operated member for controlling said air operated means, said member being adjacent said handle part for one hand operation of said booster, and said booster adjacent the end of said discharge conduit.

14. A lubricating system comprising a mobile lubricant container having a flexible discharge conduit, a pump secured to the free end of said conduit, said pump comprising a pump cylinder having an intake port at one end connected with said flexible conduit, and a discharge port in the other end of said cylinder, a spring-pressed valve for closing said discharge port, a second discharge conduit connected with said discharge port, a coupling member on the free end of said second discharge conduit for forming a quick detachable connection with a lubricant receiving nipple, a piston movable in said pump cylinder, an air cylinder larger than said pump cylinder, a piston in said air cylinder, means for connecting said pistons to move together, a spring for actuating said pistons upon their return stroke, a manually operable valve mechanism for controlling the admission of air to and exhaust from said air cylinder, and a handle part for carrying said pump, said part and valve mechanism located for one hand operation of said pump.

15. In high pressure lubricating apparatus of the class described, a lubricant container having a flexible discharge conduit, a pump secured to the free end of said conduit, said pump comprising a pump cylinder having an intake port at one end connected with said flexible conduit, and a discharge port at the other end of said cylinder, a spring pressure valve for closing said discharge port, said second conduit having an end adapted to have secured thereto a coupling member for effecting a sealed connection with the lubricant receiving part, a piston movable in said pump cylinder, an air cylinder, a piston in said air cylinder, means for connecting said pistons to move together, a spring for actuating said pistons upon their return stroke, a manually operable valve mechanism for controlling the admission of air to and exhaust from said air cylinder, an air inlet for said container, and means for connecting said inlet and said air cylinder with a common source of air under pressure, said connecting means including a flexible conduit smaller than said first discharge conduit and secured thereto throughout an appreciable part of its length.

16. A lubricating system comprising a lubricant container having a non-rigid discharge conduit, a pump secured to the free end of said conduit, said pump comprising a pump cylinder having an intake port at one end connected with said flexible conduit, and a discharge port in the other end of said cylinder, a spring-pressed valve for closing said discharge port, a second and shorter discharge conduit connected with said discharge port, said second conduit terminating in an end adapted to have secured thereto a coupling for forming a sealed connection with a lubricant receiving nipple, a piston movable in said pump cylinder, an air cylinder, a piston in said air cylinder, means for connecting said pistons to move together, a spring for actuating said pistons upon their return stroke, valve mechanism for controlling the admission of air to and exhaust from said air cylinder, said valve mechanism normally preventing admission of air to said air cylinder and including a movable part adapted to be manually operated in one direction to admit air to said air cylinder.

17. In high pressure lubricating apparatus of the class described, a lubricant container for holding a supply of lubricant under low pressure, wheels for transporting said container, a flexible discharge conduit connected to said container, a pump secured to the free end of said conduit, said pump comprising a pump cylinder having an intake port connecting with said flexible conduit and a discharge port communicating with a second conduit, a spring pressed valve for closing said discharge port, said second conduit having an end adapted to have secured thereto a coupling member for effecting a quick detachable connection with the lubricant receiving part, said coupling near said pump whereby one hand may be employed to operate said coupling and the other hand employed to carry and operate said pump, a piston movable in said pump cylinder, an air cylinder of materially greater crosssection than said lubricant cylinder, a piston in said air cylinder, means for connecting said pistons to move together, a spring for actuating said pistons upon their return stroke, a manually operable valve mechanism for controlling the admission of air to and discharge from said air cylinder, a handle part for manually carrying said pump, said valve mechanism adjacent said part for one hand operation of said pump, a flexible supply conduit for said air cylinder, a flexible sleeve-like cover connecting said supply conduit and first-mentioned discharge conduit, and an air inlet for said container.

18. In lubricating apparatus of the class described, a mobile lubricant container for maintaining a supply of lubricant under low pressure, an air inlet for said container, a discharge conduit for said container, a manually portable booster secured to the free end of said conduit, air and lubricant cylinders in said booster, said air cylinder larger than said lubricant cylinder, inlets and outlets for said cylinders, pistons in said cylinders, said pistons being connected, spring means for returning said pistons, manually operated valve mechanism for controlling the admission of air to and exhaust from said air cylinder, said mechanism including a recip- rocable member resiliently held in one extreme position and adapted to be moved to its other extreme position by manual force, a handle part adjacent said mechanism, a valve chamber for receiving the discharge from said lubricant cylinder, threaded means for connecting said chamber with a coupling for effecting a sealed connection with a lubricant receiving part, and a non-rigid air supply conduit for said booster.

19. High pressure lubricating apparatus of the class described comprising a lubricant container, wheels for transporting said container, a flexible discharge conduit for said container, a manually portable booster secured to the end of said conduit, a lubricant cylinder in said booster, inlet and outlet ports therefor, a piston in said cylinder adapted to close said inlet port, an air cylinder aligned with said lubricant cylinder and larger than the latter, a piston in said air cylinder connected to the piston in the lubricant cylinder, a spring for returning said pistons, inlet and exhaust passages for said air cylinder, a manually movable member for controlling said passages, a handle for carrying said booster, said handle and member located to permit one hand operation of said booster, a valve chamber aligned with said cylinder and adapted to receive the lubricant discharged from said lubricant cylinder, a valve normally closing the discharge port of said lubricant cylinder, a coupling communicating with said valve chamber, said coupling adapted to form a sealed connection with a lubricant receiving nipple and located adjacent said booster whereby one hand may be employed to operate said coupling and the other hand employed to operate said booster, and means to connect said booster and container with a source of air under pressure, said means including a flexible air conduit and a sleeve-like cover surrounding said air conduit and discharge conduit and maintaining them in predetermined relation.

In witness whereof, I hereunto subscribe my name this 19th day of February, 1921.

FRANK D. WINKLEY.